(12) United States Patent
Smorodinsky (10) Patent No.: US 6,496,948 B1
(45) Date of Patent: Dec. 17, 2002

(54) METHOD FOR ESTIMATING THE AVAILABILITY OF AN OPERATING SERVER FARM

(75) Inventor: Lev Smorodinsky, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/443,926

(22) Filed: Nov. 19, 1999

(51) Int. Cl.$^7$ .................................................. G06F 11/00

(52) U.S. Cl. ......................................... 714/37; 709/221

(58) Field of Search ............................. 714/37, 38, 39, 714/4, 6, 25, 43, 44, 56; 709/220, 221

(56) References Cited

U.S. PATENT DOCUMENTS

| | | | | | |
|---|---|---|---|---|---|
| 5,930,333 | A | * | 7/1999 | Jabbarnezhad | 379/14 |
| 6,003,090 | A | * | 12/1999 | Puranik et al. | 709/235 |
| 6,128,642 | A | * | 10/2000 | Doraswanmy et al. | 709/201 |
| 6,249,801 | B1 | * | 6/2001 | Zisapel et al. | 709/105 |
| 6,327,622 | B1 | * | 12/2001 | Jindal et al. | 709/228 |
| 6,334,196 | B1 | * | 12/2001 | Smorodinsky et al. | 714/37 |
| 6,363,497 | B1 | * | 3/2002 | Chrabaszcz | 714/13 |
| 6,374,297 | B1 | * | 4/2002 | Wolf et al. | 709/226 |
| 6,374,336 | B1 | * | 4/2002 | Peters et al. | 711/167 |

* cited by examiner

*Primary Examiner*—Nadeem Iqbal
(74) *Attorney, Agent, or Firm*—Alfred W. Kozak; Mark T. Starr; Lise A. Rode (57) ABSTRACT

A method and an estimator program for estimating the server farm size and the availability of the server farm for a given redundancy factor and a given particular number of clients.

8 Claims, 10 Drawing Sheets

STEPS FOR ESTIMATING A SERVER FARM AVAILABLITY
(WITH AN EXAMPLE OF ESTIMATING)
DATA INPUT

STEP 1. A=335, WHERE A IS A PARTICULAR NUMBER OF CLIENTS "n" FOR UTILIZING A SERVER FARM.

STEP 2. B=68, WHERE B IS A MAXIMUM SINGLE SERVER WORKLOAD OF USERS THAT IS AN APPLICATION PERFORMANCE BENCHMARK NUMBER OF USERS FOR A SINGLE SERVER.

STEP 3. C=65%, WHERE C IS A USAGE FACTOR THAT IS THE RATIO OF THE NOMINAL NUMBER OF USERS PER SERVER TO THE MAXIMUM NUMBER OF USERS PER SERVER (SERVER PERFORMANCE BENCHMARK MAXIMUM NUMBER OF USERS) TIMES 100 PERCENT) HERE C = Uf = 100% - Rf.

STEP 4. D = 24 HOURS, WHERE D IS A MEAN TIME TO REPAIR FOR A SINGLE SERVER.

STEP 5. E = 1200 HOURS, WHERE E IS THE MEANTIME TO FAILURE FOR A SINGLE SERVER.

CALCULATIONS

STEP 6. F = INTEGER (C*B/100) = INTEGER (65*68/100) = 44, WHERE F IS A SINGLE SERVER NORMAL WORKLOAD OF USERS.

STEP 7. IF MOD (A/B)=0 THEN G = INTEGER (A/F)
IF MOD (A/B)>0 THEN G = INTEGER (A/F) + 1,
G = INTEGER (335/44) + 1 = 8 AS MOD (335/68) = 63 > 0, WHERE G IS AN ESTIMATED SERVER FARM SIZE.

STEP 8. H = B*G = 68*8 = 544, WHERE H IS AN ESTIMATED SERVER FARM MAXIMUM (PEAK) NUMBER OF USERS.

STEP 9. I = F*G = 44*8 = 352, WHERE I IS AN ESTIMATED SERVER FARM NORMAL NUMBER OF USERS.

STEP 10. J = H - I = 544-352 = 192, WHERE J IS THE ESTIMATED SERVER FARM RESERVED NUMBER OF USERS.

STEP 11. K = INTEGER (J/B) = INTEGER 192/68 = 2, WHERE K IS THE TRAIL SERVER FARM RESERVED NUMBER OF SERVERS.

STEP 12. IF (G - K - 1)*B>=A THEN L = K + 1,
IF (G - K - 1)*B< A THEN L = K,
L = 2 + 1 = 3 AS (G - K - 1)*B=5*68=340>=335, WHERE L IS AN ESTIMATED SERVER FARM RESERVED NUMBER OF SERVERS.

STEP 13. M = MARKOVMTBF (G-L,G,1/E,1/D)=117, 761 HOURS, WHERE M IS AN ESTIMATED SERVER FARM MEAN TIME TO FAILURE AND MARKOVMTBF IS A FUNCTION THAT CALCULATES THE MTTF FOR "m-of-n" MARKOV MODEL WITH ONE REPAIR TEAM, m=G - L = 5, n=G=8.

STEP 14. N = 1 - D/M = 1 - 24/117,761 = 0.999796, WHERE N IS THE ESTIMATED AVAILABILITY OF THE SERVER FARM.

STEP 15. O = 8760*D/M, = 1.79 HOURS, WHERE O IS AN ESTIMATED DOWNTIME FOR THE SERVER FARM (THE SERVER FARM IS CONSIDERED "DOWN" IF IT CANNOT SERVICE 335 USERS.

METHOD FOR ESTIMATING THE AVAILABILITY OF AN OPERATING SERVER FARM

CROSS-REFERENCES TO RELATED APPLICATIONS

This application is related to a co-pending application, U.S. Ser. No. 08/550,603 entitled "Estimator Program for Estimating the Availability of an Application Program That Runs in a Cluster of at Least Two Computers" which application is incorporated here by reference.

FIELD OF THE INVENTION

This invention relates to data processing systems of the type which include a server farm that executes application programs for multiple clients (users); and more particularly, this invention relates to methods for estimating the "server farm size" with a given redundancy factor and estimating the "availability" of the server farm in the above type of data processing systems.

BACKGROUND OF THE INVENTION:

The co-pending application described above involves an estimator program to perform method steps for estimating the availability of an application program that runs on any "server" in a cluster of at least two servers. By "availability of an application program" is meant the probability that at any particular time instance, at least one of the servers in a cluster (farm) will actually be servicing requests from external workstations able to use the application program.

In one embodiment, the so-called estimator program begins by receiving input parameters which include (i) multiple downtime periods for each computer in the cluster (farm) that occur at respective frequencies due to various downtime sources, and (ii) an application "failover" time period for switching the running of the application program from any one computer to another computer which is operable. From these input parameters, the described estimator program estimates first and second annual stoppage times, then determines the availability of the application program on the cluster of computers which is derived from the sum of the first and second annual stoppage times.

Thus, as discussed, the estimator program of the previously-described invention estimated a first annual stoppage time for the application program due solely to the concurrent stoppage of all of the computers, as a function of the ratio of a single computer virtual downtime period over the single computer virtual time between stops. Then subsequently, the estimator program was used to estimate a second annual stoppage time for the application program, due solely to the switching of running the application program from one computer to another computer as a function of the single virtual stoppage rate and the application failover time period. From this, the estimator program determined the availability of the application program on the cluster of computers by deriving the sum of the first and second annual stoppage times.

The estimator program method was based on the assumption that "application availability" was to be determined from four factors which were:

(i) single-server hardware reliability;
(ii) maintenance, support, and service strategies;
(iii) user application and environment;
(iv) failover or system reconnection mechanism and application recovery mechanism.

The prior estimation parameters which were described in the co-pending U.S. Ser. No. 08/550,603 did not take into consideration the total number of operating server farm clients and the normal single server workload of users involved with each single server. Further, the earlier work did not provide a recommendation or estimate regarding the number of servers required in the server farm (or cluster) which would meet the customers' performance and redundancy level requirements.

This new method involving the server farm size and availability calculations is based on (1) the single server parameters such as (a) the meantime to failure (MTTF), (b) the meantime to repair (MTTR), and (c) the single server application performance benchmarks, and (2) individual customer preferential requirements, involving (a) the total number of server farm application users and (b) a desirable redundancy level.

This new method uses the following definition of the server farm availability. This definition is the probability that a server farm provides access to applications and data for a particular minimum number of users. As soon as the server farm can not serve this particular minimum number of users, it is considered failed. When some of the users have lost connections but can reconnect to other servers and continue to work and the majority of users do not experience any interruptions in their work, the farm is not considered failed, if it can still serve this particular number of users.

A widely used approach to improve a system's availability beyond the availability of a single system is by using server farms with redundant servers. In this case, if one of the farm's servers fails, the "unlucky" users connected to this server will lose their connections, but will have an opportunity to reconnect to other servers in the farm and get access to their applications and data. If all of the "unlucky" users get access to their applications and data, the farm is considered "available." If at least one of the "unlucky" users fails to get access to his/her applications and data, it means that the server farm's redundancy was exhausted and the server farm is considered failed.

The parameters for MTTF and MTTR can be estimated as indicated in the cited prior U.S. Ser. No. 08/550,603 as a single computer virtual time between failures and a single computer virtual downtime period, respectively, for a particular application and user environment.

While the present invention may be shown in a preferential embodiment for a server farm that uses any workload balancing mechanism, it is not limited thereto, and can be used for any other data processing environment where the definition of the "server farm availability" can be applied.

Thus the object of the present invention is to provide a method for estimating the "server farm size" and estimating the "availability" of the server farm based on individual server parameters including the redundancy factor. The method will generate recommendations for a customer who requires a reliable operating environment with sufficient redundancy which must continue to serve a particular number of clients (application users) even during cases of single server failures or stops for planned maintenance.

SUMMARY OF THE INVENTION:

In accordance with the present invention, a novel estimator program performs method steps for estimating the "server farm size" and estimating the "availability" of the server farm for a given redundancy factor and a given particular number of clients. By the availability of a server farm is herein meant the probability that the server farm will service not less than a given particular number of clients.

In one particular embodiment, the estimator program begins by receiving input parameters which include a redundancy factor (or a normal single server workload of users), a particular number of clients "n" for utilizing the server farm, and parameters of single servers that form the server farm.

The first single server parameter is the server performance benchmark. A benchmark value is based on the user workload simulation for a particular type of server. The second single server parameter is the server mean time between failures (MTTF) that is a measure of the single server reliability. The next single server parameter is the mean time to repair (MTTR) that is a measure of the server maintainability and/or serviceability.

Next, the estimator program uses the input parameters to generate an estimate of the farm size for the farm that will comprise servers with given parameters and will be able to serve at least a given particular number of clients "n". Then, the estimator program establishes the server reserved number of servers and provides an estimate of the server farm MTTF utilizing a Markov algorithm. Next, the estimator program estimates the availability and corresponding downtime for the server farm from the server farm MTTF and the server farm MTTR that is assumed equal to the single server MTTR.

As a result, the estimator program provides the estimations of the two very important parameters that determine the cost analyses of the investment into the highly available server farms. The application of the novel estimator program demonstrates that the server farms with higher redundancy factor (more servers and, accordingly, higher the server farm cost) deliver less server farm downtime (less downtime related to business losses, and, accordingly, less downtime cost).

BRIEF DESCRIPTION OF THE DRAWINGS:

FIG. 3 shows a server farm time diagram for a sequence of the situations presented on the FIGS. 2A–2F, respectively. FIG. 3 upper portion is a bar chart showing the usable time periods of three servers in addition to showing the non-usable time periods of the three servers. FIG. 3 lower portion is a server farm time diagram which indicates various time periods where the system can serve more than seven clients, and a time period when it is only able to serve less than seven clients;

FIG. 4 is a sequence of steps for estimating availability and downtime for a particular server farm;

GLOSSARY LIST OF RELEVANT ITEMS

1. AVAILABILITY: This is a measure of the readiness of the system and an application to deliver an expected service to the user. It may be described as a percentage of time that a system and an application are running as distinguished from the system being down for maintenance or repairs.

2. MEAN TIME TO FAILURE (MTTF): This is the average operating time between two failures, that can be estimated as the total operating time divided by the number of failures.

3. MEAN TIME TO REPAIR (MTTR): This is the average "downtime" in case of failure, that can be estimated as the total downtime divided by the number of failures.

4. DOWNTIME: The downtime or repair time for a single application server is the time interval required to restore the server and system back to normal business operation. At the end of the repair period the applications running on the repaired server are available to users.

5. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

6. ESTIMATOR PROGRAM: This is a program which performs method steps for estimating system parameters such as the availability of an application program to run on any computer or server in the cluster of at least two servers or computers. This type of estimator program was the subject of a co-pending application U.S. Ser. No. 550,603 which is incorporated herein by reference. Another estimator program is the subject of this patent application.

7. SERVER FARM: This designates a group of identical individual servers wherein each server can provide service to many single individual clients. The server farm can run enterprise class client/server applications (SAP, PeopleSoft, Microsoft SQL) or applications that are traditionally run on a single workstation (Microsoft Office 97). The server farm usually uses a work-load balancing mechanism that distributes requests for services or applications to the available servers.

8. REDUNDANCY FACTOR (Rf): This is a measure of the additional number of users that can be added to the nominal number of users per server without exceeding the maximum number of users per server (server performance benchmark maximum of users). The redundancy factor can be calculated as 100 percent minus a usage factor Uf.

9. SERVER FARM AVAILABILITY CALCULATOR: This is an estimator program which estimates the availability for the server farm.

10. THIN CLIENT SERVER FARM AVAILABILITY CALCULATOR: This is one of the examples of the SERVER FARM AVAILABILITY CALCULATOR. Because thin-client configurations are intended to make applications available to multiple users at the same time, this calculator calculates the availability of a specified number of instances of an application (not just a single instance) where each application instance is being run at the server, but all the user input response is taking place at the client terminal. In this scenario, downtime occurs whenever the number of available instances of the application drops below the required specified number of instances.

11. USAGE FACTOR (Uf): This is the ratio of the nominal number of users per server to the maximum number of users per server (server performance benchmark maximum of users) times 100 percent.

DESCRIPTION OF PREFERRED EMBODIMENT

Figure 1:
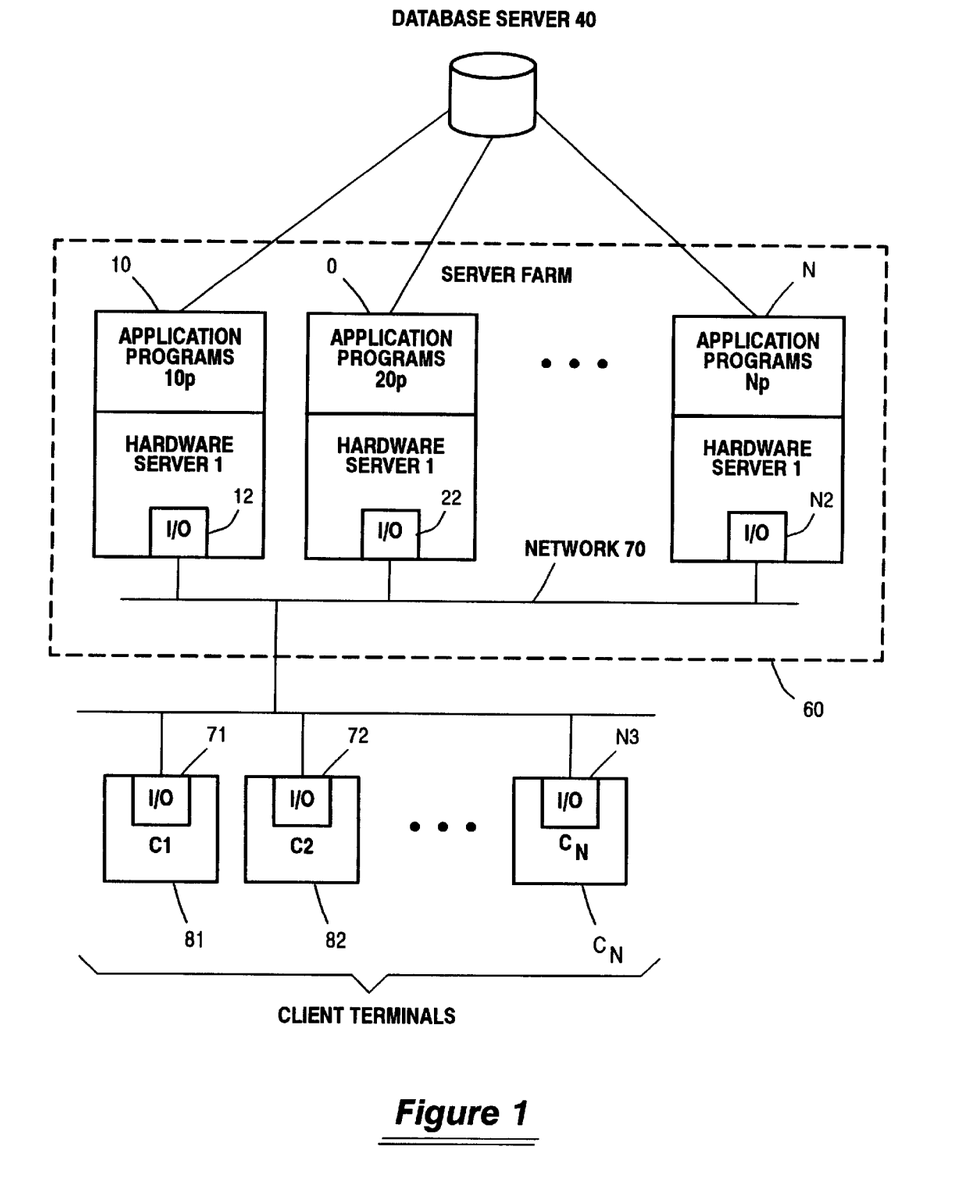
FIG. 1 is a drawing of a data processing system which includes an application server farm that executes application programs for multiple clients (users)

FIG. 1 is a generalized diagram which shows a type of environment to which the present invention relates. Shown in FIG. 1 is an application server farm 60, a database server 40, and a set of client terminals 81, 82, . . . , $C_N$, having respective I/O modules 71, 72, . . . , N3. The database server 40 is connected to a group of farm servers designated as 10, 20, . . . , N. Each of the servers is able to run application programs designated as 10p, 20p, . . . , Np. Network 70 is coupled to Input/Output (I/O) units 12, 22, . . . , N2, on the farm servers 10, 20, . . . , N and to I/O units 71, 72, . . . , N3 on client terminals 81,82, . . . , $C_N$. Users (clients) can use client terminals 81,82, . . . , $C_N$ to access the application programs in the farm servers via the network 70.

In order to lay a foundation and before a detailed flow chart of the methodology steps of the invention are presented, it may be helpful to illustrate a server farm availability definition by a series of examples regarding various configurations and conditions involving failed servers and clients connections.

Figure 2A:
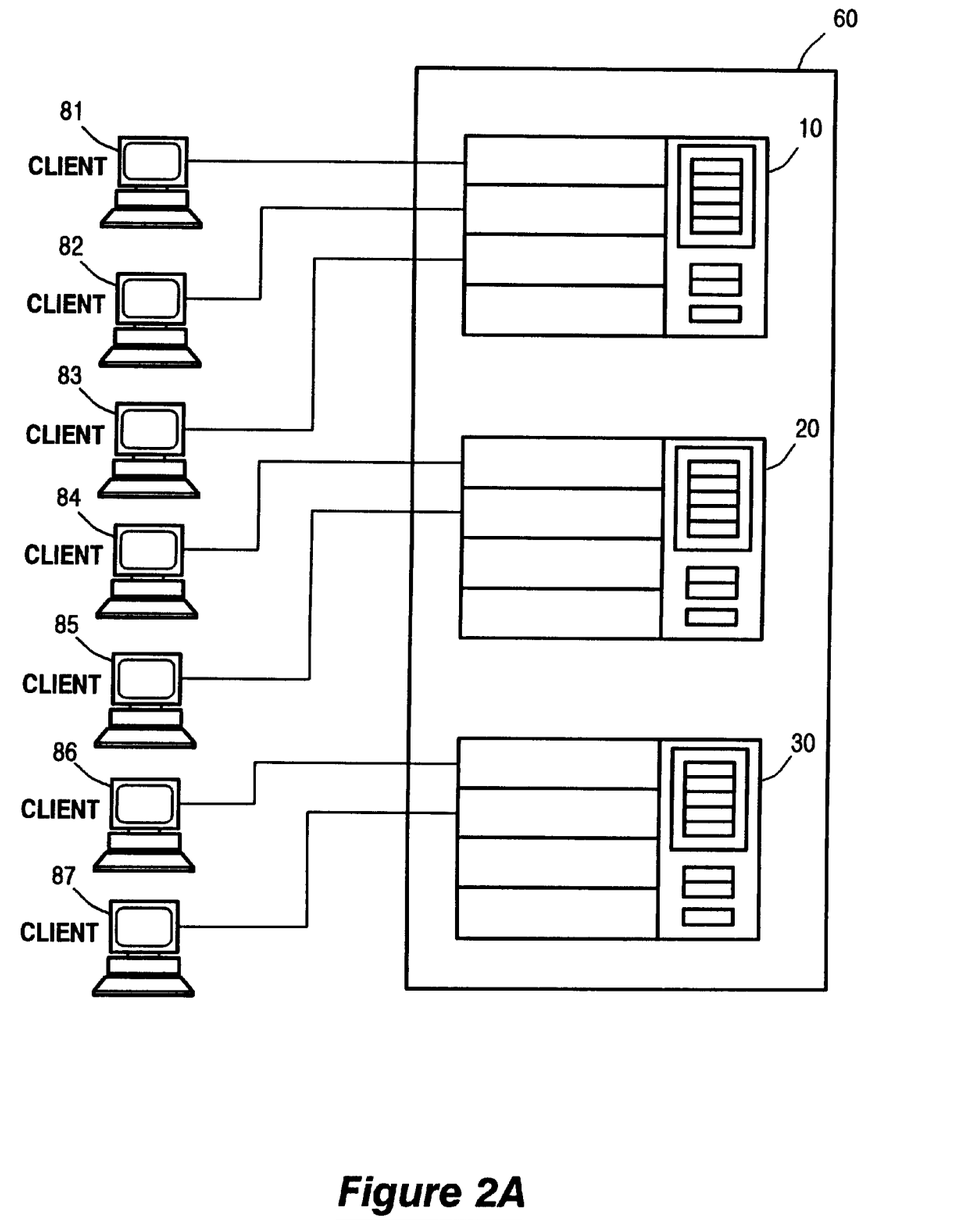
FIG. 2A is a schematic drawing of a server farm which serves 7 required clients, but can serve up to 12 clients. The farm is considered available because it can serve 7 or more clients.

Now referring to FIG. 2A, there is seen a drawing of a server farm in which there reside three servers designated 10, 20, and 30. Each of these servers has the capability of serving applications to four clients, however, it is seen that server 10 has resources for one redundant connection, server 20 has resources for two redundant unused connections, and server 30 has resources for two redundant connections available to be used. Then again as seen in FIG. 2A, the client terminals 81, 82 and 83 are serviced by the server 10; the client users 84 and 85 are serviced by the server 20; while clients 86 and 87 are serviced by the server 30.

Here, it can be noticed that the server farm 60 serves seven clients, but five additional clients can also be connected to the farm for service, if needed. In this situation, this farm 60 is considered "available" because it can serve seven or more clients, the number seven being designated as the minimum number of clients to be served by this farm.

Figure 2B:
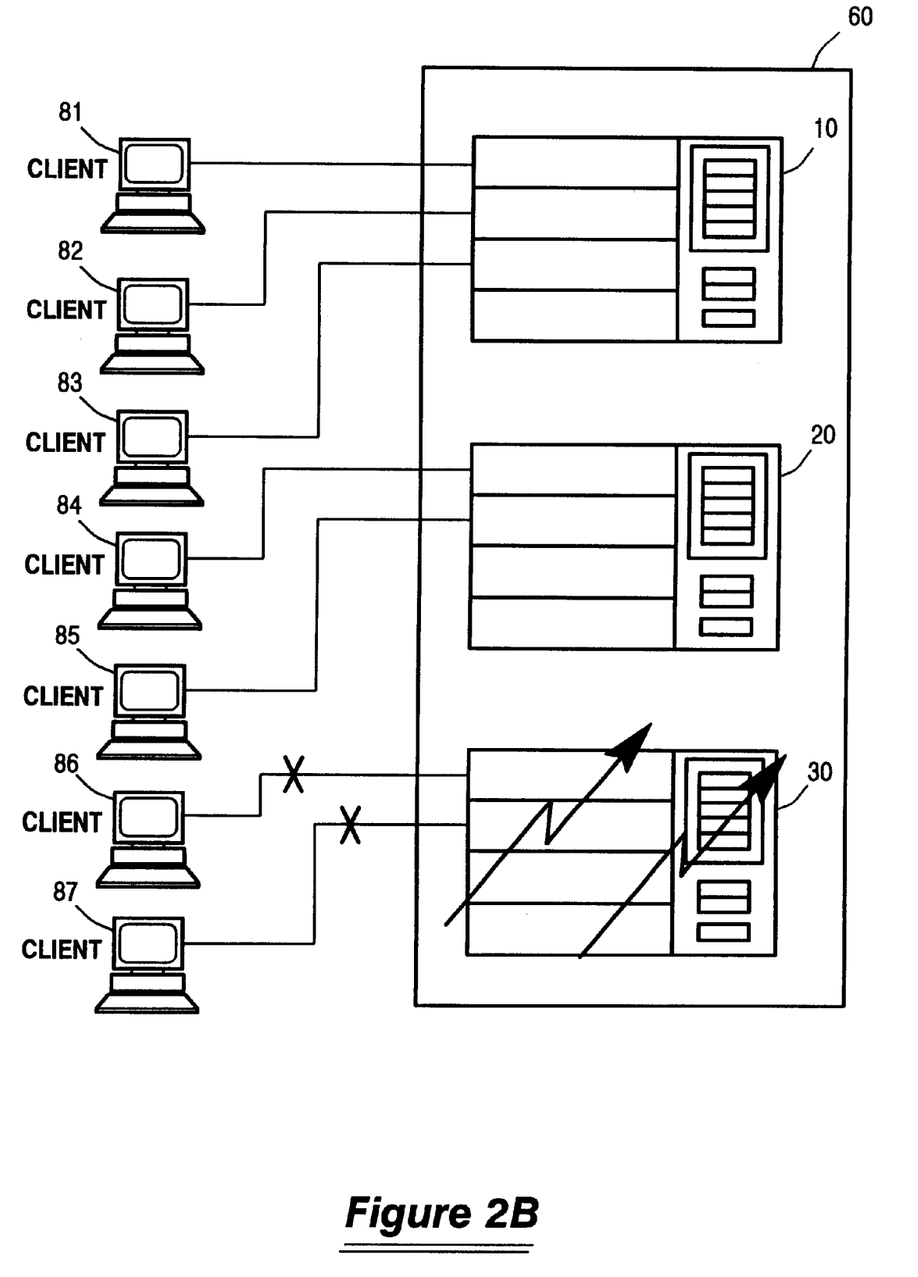
FIG. 2B is a drawing showing a server farm wherein one server of the three servers is inoperable and down and two clients lost connections to the farm.

FIG. 2B is an illustration showing the server farm 60 having three servers 10, 20 and 30 which would normally service 7 clients, except that the server 30 is now down and inoperable. Here, it is now seen that two of the users 86 and 87 have lost their connections to a workable server, however, they can reconnect to the server farm and continue to work, since server 10 has one available connection and server 20 has two available connections.

Figure 2C:
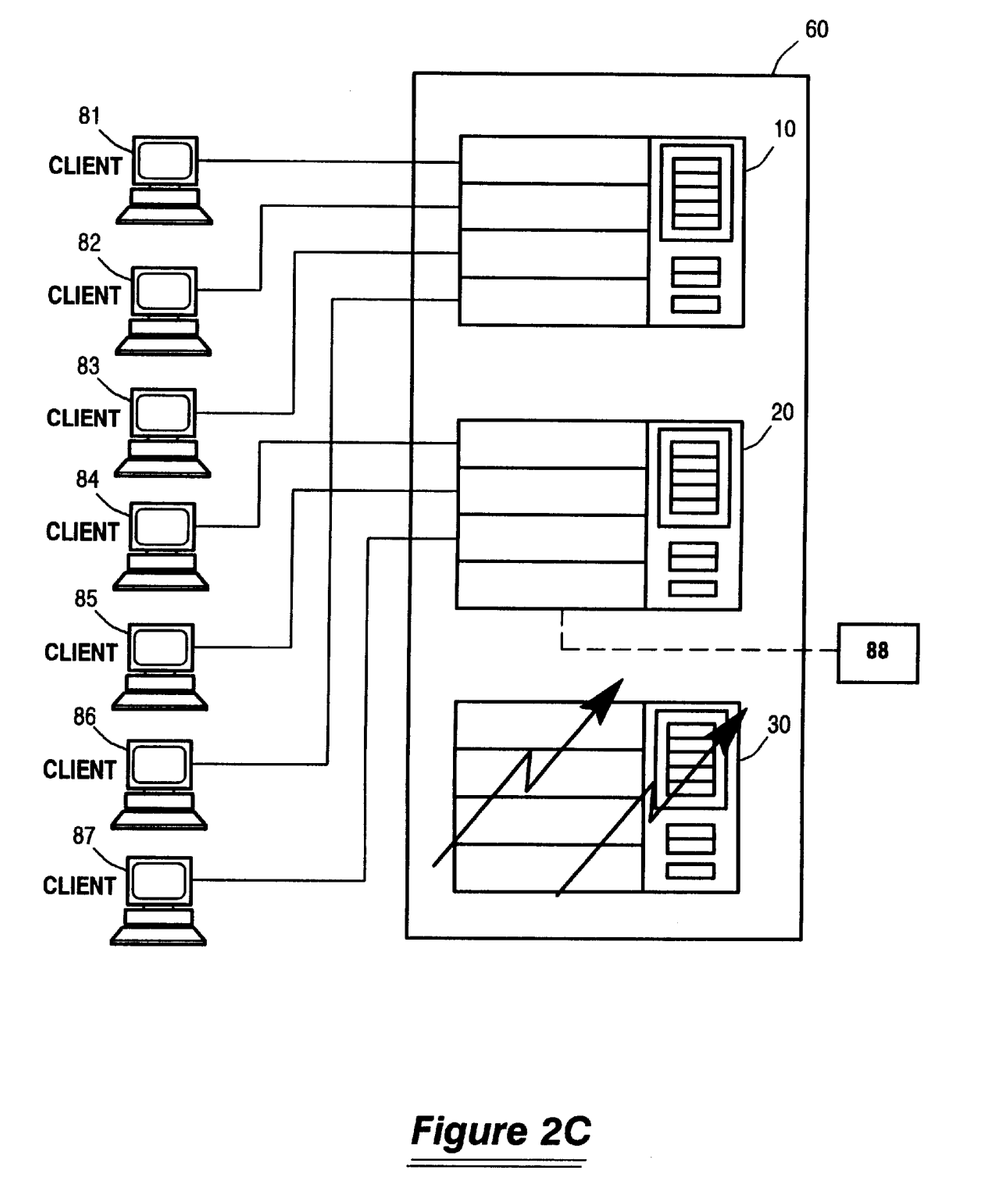
FIG. 2C is a drawing showing a server farm where one server is inoperable but the two users are reconnected to the farm and that only one additional client is available for connection to the server farm. The farm is considered available because it can serve 7 or more clients.

FIG. 2C shows the server farm 60 after the users 86 and 87 have reconnected to the server farm within the specified time interval and continue to work. The server 30 is down but all of the seven clients 81 through 87, are connected to the server farm for service and the farm is considered "available". It should be noted that even then, one additional client 88 can be connected to the server farm.

Figure 2D:
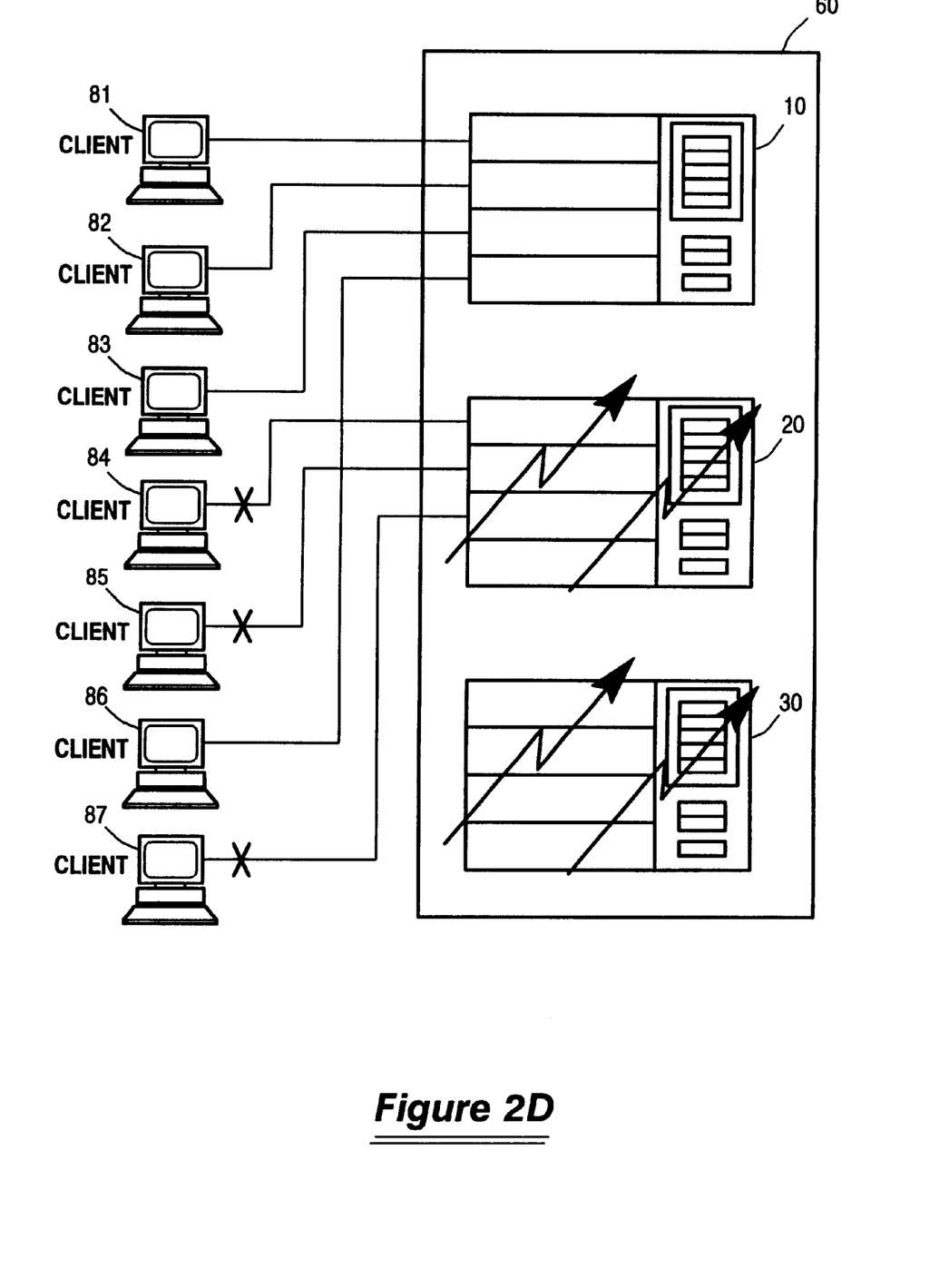
FIG. 2D is a drawing showing a server farm in which two servers are inoperable. Loss of the second server causes three users to lose connection to the farm, and they can not reconnect to the farm within the specified time interval because there are no resources available on the farm. Because the farm cannot serve 7 or more clients, it is considered not available.

FIG. 2D continues the situation shown on FIG. 2C. In FIG. 2D, a second server 20 in the farm goes down. As a result, there will be three users who have lost connection, these being client 84, 85 and 87, and they cannot reconnect to the farm within a specified time interval so as to continue to work. In this situation of FIG. 2D, the server farm can serve only four clients, 81, 82, 83 and 86, and the server farm is considered to be "not available" because it cannot serve the minimum number of seven clients.

Figure 2E:
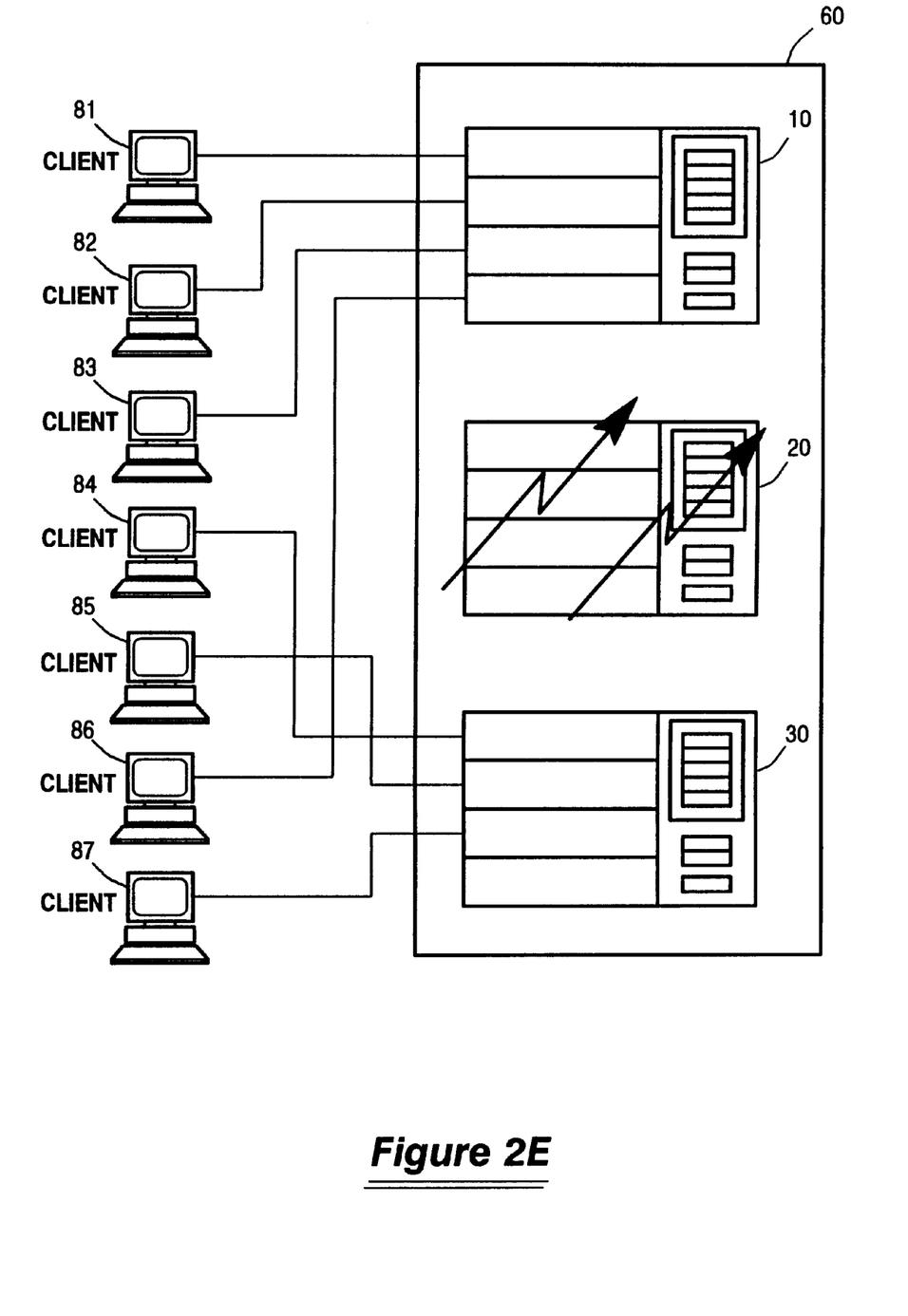
FIG. 2E is a drawing showing a server farm where one of the servers has been fixed and only one server remains inoperable. The three users who lost connections when the second server in the farm failed, can now reconnect and continue to work. Because the farm now serves 7 clients, it is considered available.

FIG. 2E continues the situation shown on FIG. 2D. In FIG. 2E, one of the two failed servers, the server 30, is fixed and the operating system and application software are recovered. The three users (84, 85, and 87) who lost their connections and could not reconnect to the farm within the specified time interval, can now reconnect to the fixed server 30, and thus continue to work. The server farm 60 can serve all the seven required clients and is considered "available" because it can serve the minimum number of seven or more clients.

Figure 2F:
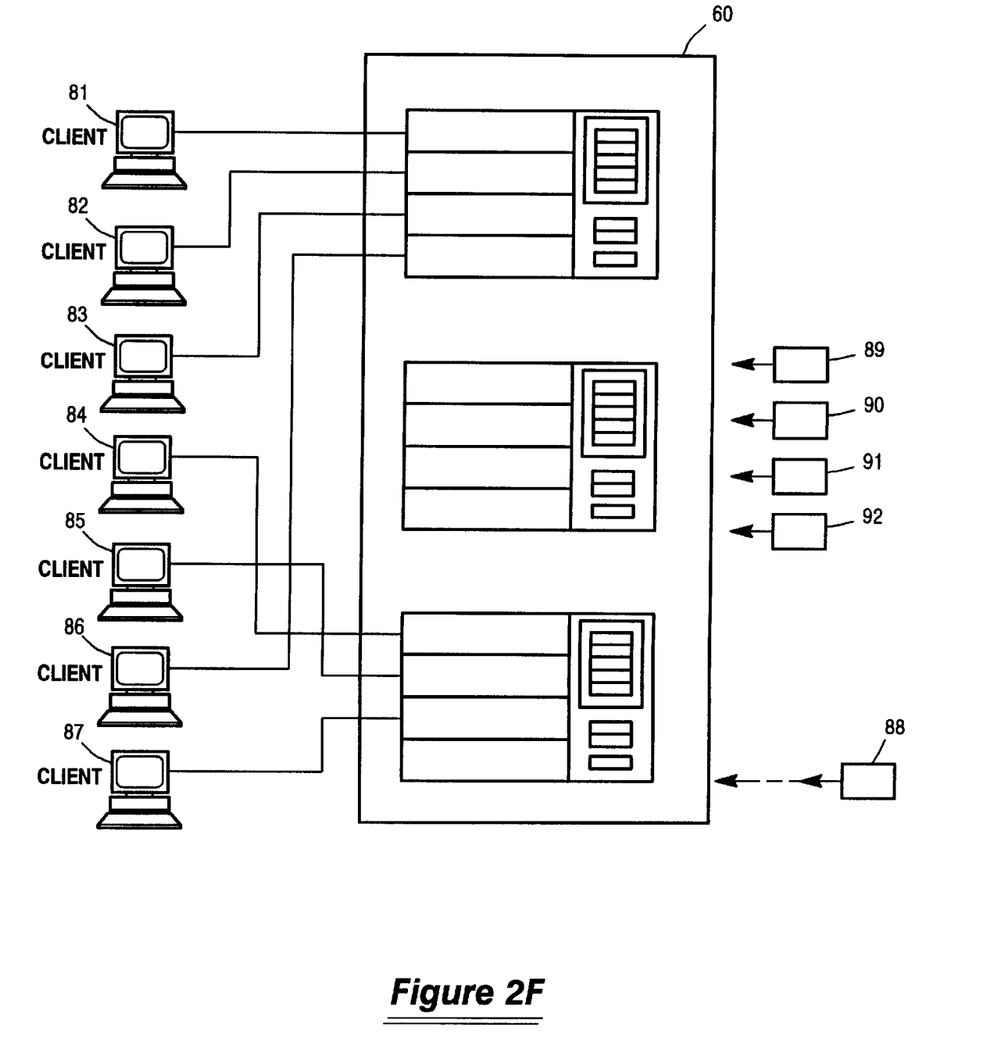
FIG. 2F is a drawing showing a server farm where the second failed server has been fixed and all servers are available. The farm serves seven clients but can serve up to twelve clients.

FIG. 2F shows that the second server 20 (of FIG. 2E) has now been fixed and the operating system and the application software are recovered. It is now seen that four additional clients 89, 90, 91 and 92, can now be connected to the server farm. The farm has now returned to its original state and can serve up to twelve clients (redundancy of 5), which are clients 81 through 92. Further, the farm is considered "available" because it can serve the required seven or more clients.

Figure 3:
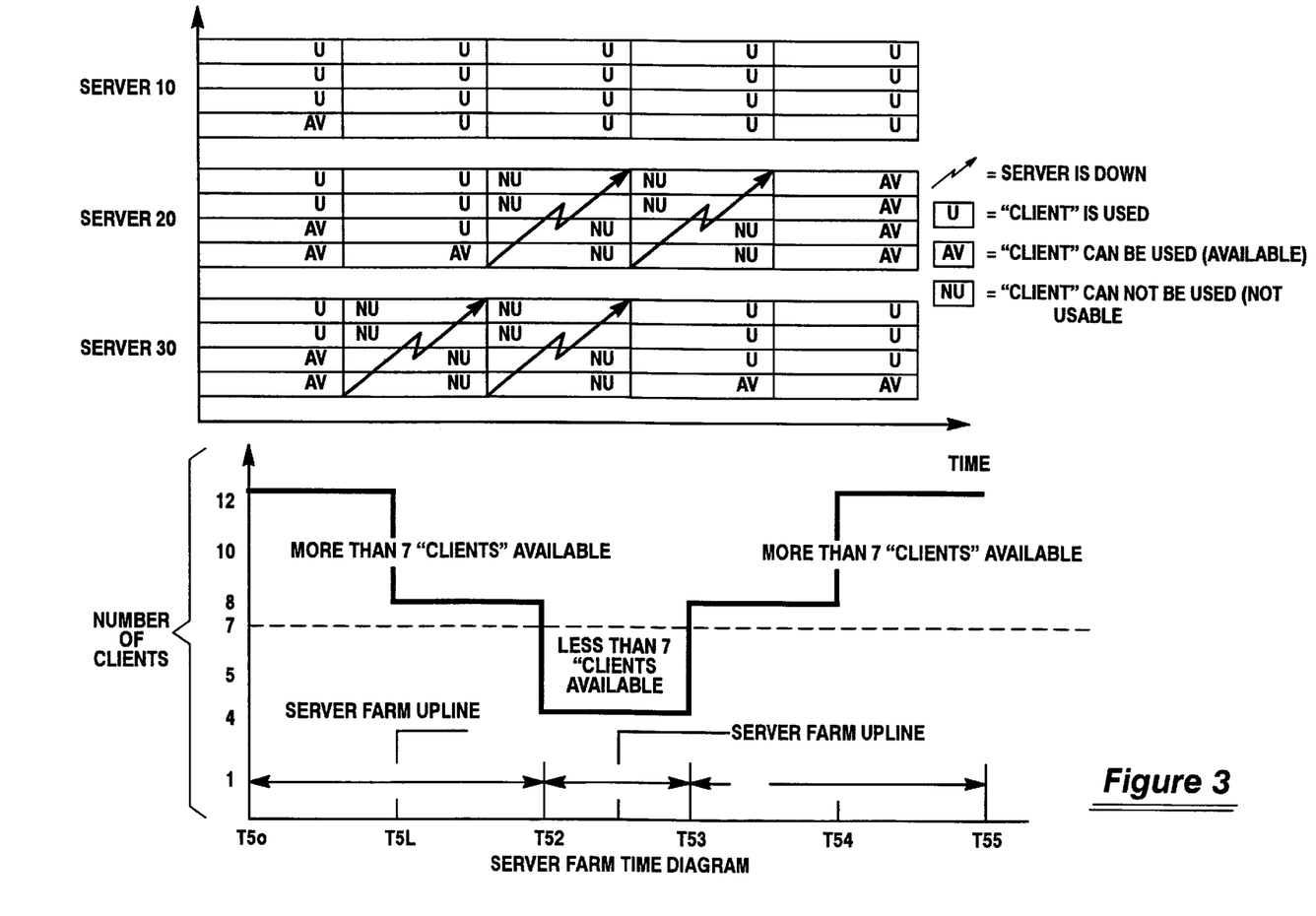

FIG. 3 shows a server farm time diagram for a sequence of the situations presented on the FIGS. 2A–2F, respectively. It shows various conditions on a timeline, areas where "more than" minimal capability is provided and areas where "less than" minimal capability is provided. The ordinate line shows the number of clients, and the timeline shows the various conditions which may occur.

Referring to FIG. 3 (lower portion) at time Ts0, it is seen that there are at least twelve clients who may be serviced for operations and this constitutes more than the required number of seven and allows a redundancy for connecting 5 clients (see FIG. 2A). Here, the uptime occurs until time Ts1, where a failure in one of the servers still permits service to at least seven clients (see FIG. 2B and 2C). Then at time Ts2, there is a breakdown of a second server. There now appears to be less than seven clients which have the availability of the applications in the server (see FIG. 2D). This continues until time Ts3, where one of the two downed servers is repaired and the condition now obtains where more than seven clients can be connected to the server farm and continue to work (see FIG. 2E). At time Ts4, both servers are repaired and operable, there is now the capability of handling twelve clients (see FIG. 2F).

FIG. 3 (upper portion) is a set of bar charts for servers designated 10, 20 and 30 (of FIGS. 2A–2F), which are spread out over a timeline. Those periods marked "U" indicate the particular portion of the server resources is used. Those periods marked "AV" indicate the particular portion of the resources has availability to service another client terminal. The periods marked with a diagonal arrow indicate that a particular server is down, and the various time periods marked "NU" mean that those resources on that particular server are not useable.

FIG. 4 is a sequence of steps for estimating availability and downtime for a particular server farm similar to the farms presented on FIGS. 1–3 and described above. Steps 1 through 5 involve parameters for Data Input, while steps 6 through 15 involve a series of prescribed calculations. It will be noted that each of these steps has been given a reference designation, such as A, B, C, etc., which are later used for certain types of calculations for certain numbers of the steps. Additionally, it will be noted that there is an example given which will make the illustration more concrete.

The parameters for Data Input and Calculations are listed below:

A is the particular number or clients "n" for utilizing a server farm.

B is the maximum single server workload of users which denotes an application performance benchmark number of users for a single server.

C is the normal single server workload of users as a percentage of the maximum single server workload of users. Here C=100%—the redundancy factor Rf.

D is the meantime to repair (MTTR) for a single server.

E is the meantime to failure (MTTF) for a single server.

F is the single server normal workload of users.

G is the estimated server farm size (i.e., the number of servers involved).

H is the estimated server farm maximum (peak) number of users.

I is the estimated server farm normal number of users.

J is the estimated server farm reserved number of users.

K is the trial server farm reserved number of servers.

L is an estimated server farm reserved number of servers.

M is the estimated server farm meantime to failure and MarkovMTBF is a function that calculates the MTTF for "m—of—n" Markov Model with one repair team, m=G−L.

N is the estimated availability of the server farm.

O is the estimated downtime for the server farm.

The server farm is considered "down" if it cannot service A number of users.

FIG. 4 illustrates a typical concrete example of the methodology for developing the estimate of server farm availability.

At step 1, the reference A is seen to be set at the selection for the particular number of clients "n" for utilizing a server farm, and in this case, this exemplary number is set at 335 clients (application users).

Then at step 2, the next selection is the maximum single server workload of users which involves the application performance benchmark maximum number of users. In this case, this is designated as the reference B and set at a figure of B=68 users.

At step 3, reference C is designated as the usage factor Uf, that is the ratio of the normal single server workload of users to the maximum single server workload of users times 100 percent. C is set at 65%. Note, that Uf is very closely related to the redundancy factor Rf: Uf=100%−Rf.

At step 4, there is a selection of the meantime to repair which is indicated as the reference D, and this is set at a figure of 24 hours.

At step 5, there is a selection of the meantime to failure for a single server and this is cited as reference E, and set at a figure of 1,200 hours.

At step 6, there is designated the single server normal workload of the users and shown as reference F. This is seen as a number of 44 users. This figure is indicated as an integer which is the product of reference C and reference B divided by 100, which is 65×68/100=44 users.

At step 7, there is developed the estimated number of servers for the server farm size. Here, the reference to this estimated farm size is designated as G, and is calculated at the number 8. Further, it should be noted that if the modulus reference A/B is greater than zero (0), then the calculation for G involves an integer in which the reference A is divided by the reference F, to which is added a 1. Further, if reference A/B is =0, then the G calculation also involves an integer which is the reference A divided by the reference F. Here, as was noted, the number G of servers (estimated server farm size) is seen as 8 servers since Integer(355/44)+ 1=8.

At step 8, the estimated server farm peak number of users is shown as reference H and is set at a number of 544 users. This results from the product of reference B and reference G where 68×8=544.

At step 9, the estimated server farm normal number of users is developed and shown as reference I, and is calculated at the number of 352. This is developed as the result of the product of reference F and reference G, that is to say, 44×8=352.

At step 10, the estimated server farm reserved number of users (J) is developed by subtracting the reference I (352) from the reference H (544) in order to get the number of 192 as the reserve number of users, and this factor is designated as reference J.

At step 11, the trial server farm reserved number of servers (K) is developed by taking the reference J and dividing it by reference B, which results in 192 being divided by 68, which is designated here as the integer reference K. This is made into an integer=2 for reference R.

At step 12, there is developed the estimated server farm reserved number of servers which can serve the particular number "n" of clients. This estimated number of servers is designated by reference L. These calculations are shown when reference A is equal to or less than reference G minus reference (K+1) all multiplied by reference B. Thus, if (G−K−1)×B>=A, then L=K+1. Also, if reference G minus reference (K+1) multiplied by reference B is less than reference A, then L=K, such that if (G−K−1)×B<A, then L=K. Since (G−K−1)×B=(8−2−1)×68=340 which is greater than 335 (A), then L=K+1=2+1=3.

At step 13, there is the estimated server farm meantime to failure, and this factor is designated as reference M, and is indicated as 117,761 hours. This is developed from a Markov function estimated mean time to failure shown as reference M=MarkovMTTF (G−L, G, 1/E, 1/D).

At step 14, there is seen the estimated "availability" N for the server farm and this factor (N) is developed by the formula N=1−D/M. This figure is seen as being 0.999796. N=1−24/117,761=0.999796.

At step 15, there is now seen the estimated downtime (O) for the server farm when it cannot serve the minimum 335 users. The hours per year of downtime is developed by taking 8760 hours per year and multiplying this by D/M which results in 1.79 hours downtime per year.

Table I demonstrates the availability analysis based on the server farm introduced in the FIG. 4 example.

The results of data input and calculations from FIG. 4 are presented in Table I, columns 1–3. With an assumption, that this is a current solution for a company that plans to increase a particular number of clients "n" from 335 to 400 (it is about 20% increase), the columns 4,5, and 6 show three possible solutions for different levels of the redundancy factor Rf (25%, 30%, and 35%), seen at columns 4, 5, 6 of Table I.

The first solution (column 4) is decreasing the redundancy factor Rf from 35% to 25%. In this case the estimated number (line G) of servers (8) will not change but the estimated number of the server farm redundant servers will drop from 3 to 2 (line L). As a result, the estimated system downtime (line O) will increase from 1.8 hour/year to 17.6 hour/year and availability (line N) will drop from 0.999796 to 0.997992.

TABLE 1

Server Farm Availability Analysis
Server Farm Availability Calculator

| 1 | 2 | 3 | 4 | 5 | 6 |
|---|---|---|---|---|---|
| | DATA INPUT | | | | |
| A | Particular number or clients "n" for utilizing a server farm | 335 | 400 | 400 | 400 |
| B | Application performance benchmark number of users for a single server | 68 | 68 | 68 | 68 |
| C | Usage factor Uf, % | 65.0% | 75.0% | 70.0% | 65.0% |
| | Redundancy factor, Rf = 100%-Uf | 35.0% | 25.0% | 30.0% | 35.0% |
| D | Single server MTTR, hours | 24 | 24 | 24 | 24 |
| E | Single server MTTF, hours | 1,200 | 1,200 | 1,200 | 1,200 |
| | CALCULATIONS | | | | |
| F | Normal workload number of users | 44 | 51 | 47 | 44 |
| G | Estimated server farm size as a number of servers | 8 | 8 | 9 | 10 |
| H | Estimated server farm peak (max) number of users | 544 | 544 | 612 | 680 |
| I | Estimated server farm normal number of users | 352 | 408 | 423 | 440 |
| J | Estimated server farm reserved number of users | 192 | 136 | 189 | 240 |
| L | Estimated server farm reserved number of users | 3 | 2 | 3 | 4 |
| M | Estimated server farm MTTF | 117,761 | 11,950 | 68,472 | 351,203 |
| N | Estimated server farm availability (%) | 99.9796 | 99.7992 | 99.9650 | 99.9932 |
| O | Estimated server farm downtime, hour/year | 1.8 | 17.6 | 3.1 | 0.6 |

If this solution is not acceptable, then another solution that is an increase of the redundancy factor Rf by 5% from 25% to 30% will result in buying an additional server (column 5). In this case, the estimated number of the server farm redundant servers (3) is not reduced. Nevertheless, the estimated downtime for the second solution is about 3 hours/year (column 5) that is still worse than the original 1.8 hour/year (column 3). The next step is a third solution that has the same redundancy factor Rf=35% as the current solution (column 6). The system with 4 redundant servers will have the estimated system downtime 0.6 hour/year and the estimated server farm availability 0.999932. If the server farm downtime increase is not acceptable when additional 65 concurrent users must be added, the third solution should be recommended for an implementation.

Following is a description of the Markov mean time to failure function (MarkovMTTF) which is illustrated with a series of equations. The algorithm for the Markov function is detailed in a book entitled "*Reliable Computer Systems*", Second Edition, by Daniel P. Siewiorek and Robert S. Swarz, which was published by Digital Press in 1992. Mean time to failure for a server farm is given by:

$$MarkovMTTF(m, n, \lambda, \mu) = \frac{\sum_{j=0}^{n-m} \lambda^{n-m-j} \mu^j c_j}{n! \lambda^{n-m+1}}$$

where, $C_j = (n-j)!/j \, [((n/j)/((m-1+j)/j))-1]$ for $j>0$ $C_0 = (n!) \, (1/m + 1/(m+1) + 1/(m+2) + \ldots + 1/n)$ m=L=minimum number of servers which can serve a particular number of clients n=G=estimated total number of servers in a server farm $\lambda=1/E$=failure rate for a single server $\mu=1/D$=repair rate for a single server As was indicated in FIG. 4 at step 13, MarkovMTTF is a function that calculates the mean time to failure for m-of-n Markov model with one repair team or person.

Figure 5:
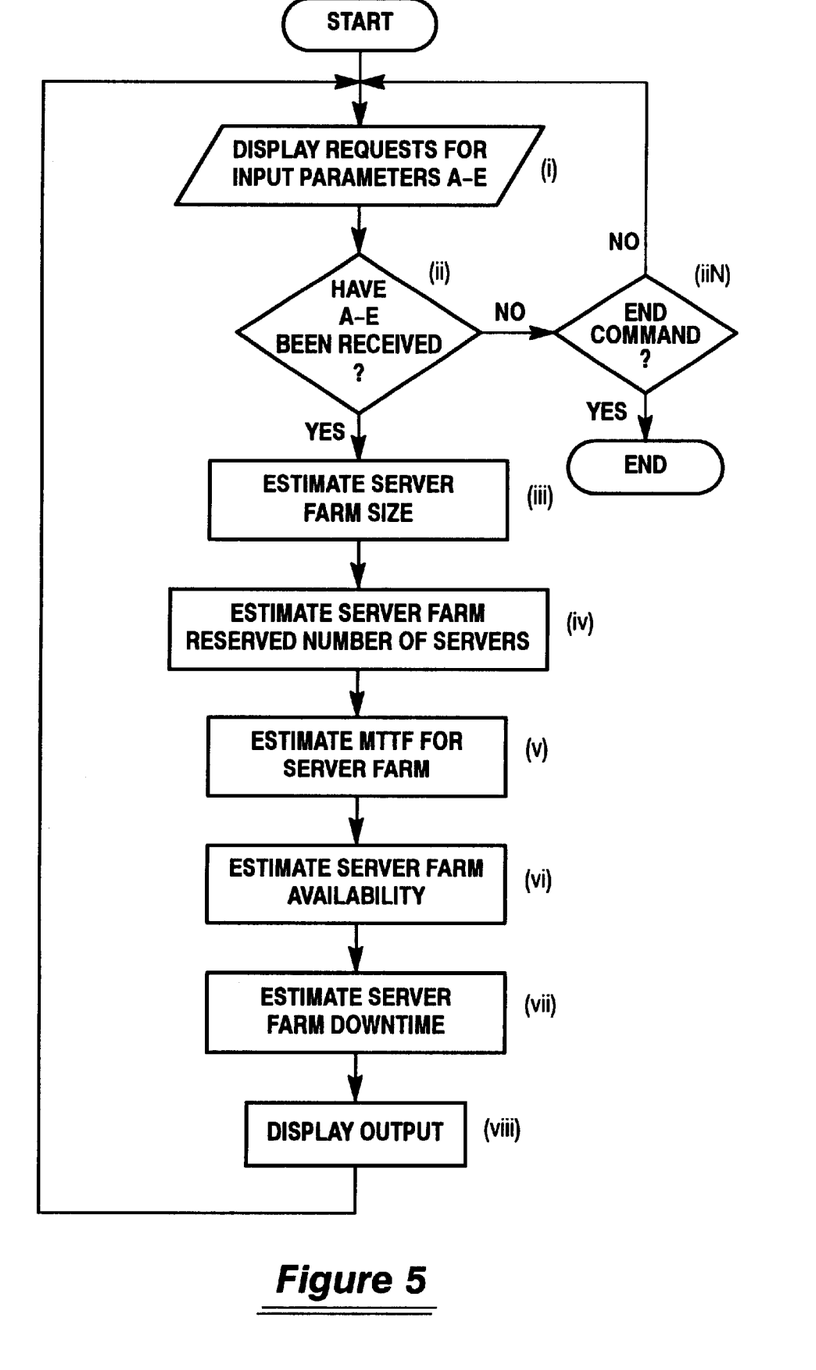
FIG. 5 is a flow chart which describes the steps involved to estimate server farm availability and estimate server farm downtime using the parameters for a selected configuration.

FIG. 5 will be seen to show a flow chart which describes the steps involved to estimate the server farm availability and downtime using the parameters and factors for a selected configuration as was illustrated in the previous description of FIG. 4. Now referring to FIG. 5, there is seen the start of a process where at step (i), a request is made for the input parameters A through E as was illustrated in FIG. 4.

At step (ii) the decision block has a query as to whether or not the input parameters A through E have been received. If the answer is (NO), then at step (iiN), a query is made rather to end the command and if the answer is (YES), this particular sequence is stopped.

Returning to step (ii), if the parameters A through E have been received (YES), then the sequence proceeds to step (iii), where there is made an estimate of the server farm size.

In the next step (iv), there is made an estimate of the server farm reserved number of servers.

At step (v), an estimate of the meantime to failure is made for the server farm.

At step (vi), it is now possible to determine the server farm availability (from step 14 of FIG. 4), after which at step (vii) it is now possible to calculate the server farm downtime (step 15, FIG. 4) and display the outputs at step (viii).

In summary, it can thus be seen that the group of parameters A though O listed earlier, can be used to estimate the server farm size, the availability of the server farm, and the downtime of the server farm for a selected required number of clients (users) and a selected usage factor.

Described herein has been a method and an estimator program for estimating the availability of an operating server farm designed to serve a particular number of clients.

While a preferred implementation of the invention has been described, it should be understood that other implementations may be used which are still encompassed by the attached claims.

What is claimed is:

1. An estimator program that performs method steps for estimating the availability of an operating server farm designed to serve a particular number of clients "n" comprising the steps of:

(a) inputting a group of parameters involving at least one server farm parameter and one single-server parameter;

wherein said step (a) of inputting said group of parameters includes the steps of:
- (a1) selecting for input said particular number of clients "n" for utilizing said server farm;
- (a2) selecting for input a maximum single server workload of users;
- (a3) selecting for input a normal single server workload of users as a percent of the maximum (peak) single server workload of users;
- (a4) selecting for input a mean time to repair (MTTR) a single server;
- (a5) selecting for input a mean time to failure (MTTF) for a single server;
- (b) generating an estimate of farm size for said server farm;
- (c) establishing the server farm reserved number of servers;
- (d) providing an estimate of the mean time to failure (MTTF) for said server farm;
- (e) estimating the availability of said server farm.

2. The method of claim 1 wherein step (b) for generating an estimate of server farm size includes the steps of:
- (b1) calculating the single server normal workload of users as the nearest integer that is not greater than the product of percentage of the single server normal workload of users and said selected maximum single server workload of users divided by 100;
- (b2) calculating the estimated server farm size as the nearest integer that is not greater than the ratio of said particular number of clients "n" over said normal single server workload of users;
- (b3) incrementing said estimated server farm size by one if the remainder of the division of said particular number of clients "n" by said maximum single server workload of users is greater than zero.

3. The method of claim 1 wherein step (c) for establishing the server farm reserved number of servers, includes the steps of:
- (c1) estimating the server farm peak number of users as the product of said maximum single server workload of users and said estimated server farm size;
- (c2) estimating the server farm normal number of users as the product of said normal single server workload and said estimated server farm size;
- (c3) estimating the server farm reserved number of users by subtracting said estimated server farm normal workload number of users from said estimated server farm peak number of users;
- (c4) estimating on a trial basis the estimated server farm reserved number of servers as the nearest integer that is not greater than the ratio of said estimated server farm reserved number of users over said maximum (peak) single server workload of users;
- (c5) verifying said estimated server farm reserved number of servers.

4. The method of claim 3 wherein step (c5) includes the steps of:
- (c5a) calculating a trial minimum number of servers which can serve a particular number "n" of clients by subtracting said estimated trial server farm reserved number of servers, increased by one, from said estimated server farm size;
- (c5b) calculating an estimated maximum number of clients who can be served by said trial minimum number of servers by multiplying said trial minimum number of servers by said maximum (peak) single server workload of users;
- (c5c) establishing the said trial server farm reserved number of servers equal to said trial server farm reserved number of servers in the case of a successful verification on condition that said trial maximum number of clients is greater than or equal to said particular number of clients "n";
- (c5d) establishing the trial server farm reserved number of servers equal to said trial server farm reserved number of servers increased by one for a case of unsuccessful verification on the condition that said estimated maximum number of clients is less than said particular number of clients "n".

5. The method of claim 1 wherein step (d) for providing an estimate of meantime to failure (MTTF) for said server farm includes the steps of:
- (d1) utilizing a Markov algorithm to estimate MTTF while involving (i) the said minimum number of servers which still permit said server farm to serve said particular number of clients "n" in the case that said server farm reserved number of servers are inadequate to service "n" clients (failure); (ii) said server farm size; (iii) the reciprocal of said selected MTTF for a single server; (iv) the reciprocal of said selected MTTR for a single server.

6. The method of claim 1 wherein step (e) for estimating the availability of said server farm includes the step of:
- (e1) subtracting the ratio of said selected MTTR for a single server to said estimated MTTF for said server farm, from one.

7. The method of claim 1 which includes the step of:
- (f) estimating the downtime of said server farm.

8. The method of claim 7 wherein step (f) for estimating the downtime per year, in hours, of said server farm includes the step of:
- (f1) multiplying the ratio of said selected MTTR for a single server over said estimated MTTF for said server farm, with the number of hours per year (8760).

* * * * *